United States Patent [19]

Evans et al.

[11] Patent Number: 5,487,951
[45] Date of Patent: Jan. 30, 1996

[54] MAGNETIC RECORDING MEDIUM WITH A BINDER RESIN OF A STARBLOCK COPOLYMER HAVING AT LEAST SIX ARMS

[75] Inventors: Christopher M. Evans, Walden; Colin F. W. Norman, Bishop's Stortford, both of England

[73] Assignee: Minnesota Mining and Manufacturing Company, St. Paul, Minn.

[21] Appl. No.: 175,439

[22] PCT Filed: Jul. 7, 1993

[86] PCT No.: PCT/US92/05705

§ 371 Date: Jan. 7, 1994

§ 102(e) Date: Jan. 7, 1994

[87] PCT Pub. No.: WO93/01592

PCT Pub. Date: Jan. 21, 1993

[30] Foreign Application Priority Data

Jul. 8, 1991 [GB] United Kingdom ............ 914668

[51] Int. Cl.$^6$ ............................................ G11B 5/00
[52] U.S. Cl. .................. 428/523; 428/694 B; 428/900; 252/62.54
[58] Field of Search .................. 428/694 B, 900; 252/62.54

[56] References Cited

U.S. PATENT DOCUMENTS

| | | | |
|---|---|---|---|
| 3,280,084 | 10/1966 | Zelinski et al. | 260/83.7 |
| 3,929,659 | 12/1975 | Graham | 252/62.54 |
| 3,975,567 | 8/1976 | Leck | 428/315 |
| 3,985,830 | 10/1976 | Fetters et al. | 260/880 |
| 4,086,298 | 4/1978 | Fahrbach et al. | 260/880 |
| 4,180,530 | 12/1979 | Bi et al. | 525/98 |
| 4,328,935 | 5/1982 | Steel | 242/192 |
| 4,448,846 | 5/1984 | Chang et al. | 428/412 |
| 4,567,083 | 1/1986 | Arioka et al. | 428/141 |
| 4,645,723 | 2/1987 | Malzer et al. | 428/694 |
| 4,780,367 | 10/1988 | Lau et al. | 428/355 |
| 4,963,402 | 10/1990 | Wong | 428/1 |
| 5,128,215 | 7/1992 | Pendergrass, Jr. | 428/694 |

FOREIGN PATENT DOCUMENTS

| | | |
|---|---|---|
| 464827 | 1/1992 | European Pat. Off. |
| 985614 | 3/1965 | United Kingdom . |
| WO90/14662 | 11/1990 | WIPO . |

OTHER PUBLICATIONS

Webster, Articles, "Living Polymerization Methods," pp. 887–892 (Feb. 1991).
Bates, Science, Polymer–Polymer Phase Bahavior, vol. 251, pp. 898–904 (1991).
Legee et al. (editor), Thermoplastic Elastomers: A Comprehensive Review, pp. 68–79 and 466–470 (1987).
McGrath (editor), Anionic Polymerization, Kinetics, Mechanisms, and Synthesis, Symposium at 179th Meeting of the American Chemical Society, pp. 41–57 (1981).
Fetters, J. Polymer Sci.: Part C, No. 26, pp. 1–35 (1969).
Peterlin et al. (editors), Macromolecular Reviews, vol. 3, pp. 367–401 (1970).
R. C. Jordan et al., Size Exclusion Chromatography with Low–Angle Laser Light–Scattering Detection, ACS Symposium Series, No. 245, 1984.
The Complete Handbook of Magnetic Recording, Ch. 13 entitled "Manufacture of Magnetic Tapes and Discs" by F. Jorgensen, 3rd Edition (ISBN 0-8306-1979-8).

*Primary Examiner*—Stevan A. Resan
*Attorney, Agent, or Firm*—Gary L. Griswold; Walter N. Kim; David B. Kagan

[57] ABSTRACT

Magnetic recording medium of the type comprising magnetizable particles dispersed in a binder, wherein the binder comprises a star block copolymer having an average of at least six arms.

7 Claims, No Drawings

MAGNETIC RECORDING MEDIUM WITH A BINDER RESIN OF A STARBLOCK COPOLYMER HAVING AT LEAST SIX ARMS

TECHNICAL FIELD

This invention relates to magnetic recording media and in particular to the use of star block copolymers of defined formula as binders for such media.

BACKGROUND ART

Magnetic recording is the preferred method of information storage when data must be capable of being read immediately after writing or where the data is to be processed by a machine. The recording medium usually consists of fine, magnetizable particles which are dispersed in a polymeric binder and coated onto a support. In order to work efficiently, magnetic media must possess certain physical and magnetic properties, e.g., the medium surface must be sufficiently smooth to enable accurate reading of the recorded signal by the magnetic head. It must also be free from asperities and other surface roughness that can lower the signal to noise ratio. In addition, the medium must be durable, so that it is possible to record and reproduce information repeatedly. To be durable, the magnetic particles must be firmly bound to the support and not be worn off by the passing of the magnetic head over the media. This durability must persist under all environmental conditions under which the medium is to be used. In addition, it is important that the media have sufficient lubricity so that the magnetic head passes freely over the surface with the minimum coefficient of friction. Furthermore, the medium should have uniform physical properties over a wide temperature range.

Magnetic recording media are normally produced by passing a non-magnetic support through an apparatus which coats the support with a liquid dispersion of the magnetic medium. This dispersion consists of a binder, in either an uncured or solvated state, having the magnetizable particles homogeneously dispersed therein. After coating, the dispersion dries or cures to give a tough binder film having the magnetizable particles uniformly distributed throughout. The desired physical and magnetic properties of the recording layer are often dictated by certain processing parameters. One important parameter is good pigment wetting in the bulk liquid dispersion. Good pigment wetting is closely related to dispersion stability and is essential to ensure an even distribution of pigment throughout the finished magnetic coating.

Another important processing parameter is the so-called 'pot-life' of the dispersion, the time for which the dispersion can be kept at a sufficiently low-viscosity before coating. Most conventional, magnetic media rely on a chemical reaction between a polyfunctional isocyanate crosslinking agent and hydroxy functionality on the binder material to cure the coating and so toughen it. The isocyanate is generally added to the dispersion prior to coating (known as an activation step) and consequently the dispersion has a finite pot-life. if the cure reaction is too fast, the resultant short pot life creates time constraints on the coating process and can make it difficult to obtain sufficiently smooth coatings. If the cure reaction is too slow, the magnetic coating will have poor green strength until the cure reaction has progressed sufficiently. As a result, the magnetic coating will be susceptible to damage during subsequent processing steps unless an inconvenient and expensive time delay is built into the manufacturing process. Furthermore, the need for an activation step (or post-coating cure step as in e-beam crosslinked systems) complicates and thus increases the cost of media production.

The bulk of the binder materials used in the preparation of conventional media are of relatively low molecular weight. Consequently, a cure reaction is essential to produce media having the appropriate mechanical properties. A further problem inherent in this approach arises from the very presence of these low molecular weight species. If the cure reaction, for any reason, is incomplete, then low molecular weight species can remain in the coated media following curing. Such species can plasticize the media leading to poor media durability. The low molecular weight species may prematurely gel or cause flocculation of the magnetic particles resulting in non-uniform and unacceptable magnetic performance of the coatings. Furthermore, low molecular weight species left after curing may migrate to the surface of the media and come into contact with the recording head where they can adversely affect performance through increased friction, stiction, head clogging and/or poor blocking resistance.

Another problem encountered with conventional binder systems is the degradation of the binder material through hydrolysis or oxidation. This leads to an increase in the amount of low molecular weight species in the binder matrix and hence to an increased occurrence of the problems described above.

Many known polymeric binder systems exhibit a change in physical properties over a range of temperatures. This change is caused by the glass-transition temperature (Tg) of the chosen binder material(s) falling within the temperature range in which the media is to be used. Magnetic media are often exposed to a wide range of temperatures, often over a range in excess of 100° C. In an extreme case a binder system can go from a stiff, brittle material at a low temperature, to a soft, tacky material as the temperature is increased. Such changes in physical properties can cause performance problems during use of the media.

In view of the above deficiencies in prior art magnetic media binders, there is a need to provide a binder suitable for use in magnetic media which is comprised of high molecular weight starting materials and which does not require polymerization or crosslinking to form a suitable magnetic coating. In addition, it is desirable that these high molecular weight binder materials provide good pigment wetting and dispersion stability, including systems with high pigment loadings. It is also desirable that the magnetic media have good mechanical properties, such as smoothness, durability and lubricity, along with good electrical properties, such as signal-to-noise ratio. It is also desirable that the physical and magnetic properties of the media are relatively uniform throughout a wide range of temperatures.

International Patent Publication No. WO90-14662 discloses an improved magnetic recording medium comprising a nonmagnetic support with at least one magnetic layer comprising a magnetizable pigment dispersed in a binder composition comprising a block copolymer of a hard polymer having a glass-transition temperature of at least 70° C. and a soft polymer having a glass-transition temperature of less than −30° C.

The manufacture of such block copolymers in which one or more blocks of a hard, non-elastomeric polymer is/are bonded to one or more blocks of a soft, elastomeric polymer is known. Depending on the content of the hard and soft polymer blocks in the copolymer, the block copolymer will exhibit non-elastomeric or elastomeric properties. Successive polymerization of the monomers results in block copolymers having a linear structure. If such linear block copolymers are coupled to one another by polyfunctional reactive compounds, branched block copolymers having a star-shaped structure result. The term "star" describes the structure of a multi-arm polymer with copolymer arms which are joined together at a nucleus formed of a coupling moiety or linking agent which is effectively a point relative to the overall size of the remainder of the polymer structure. Methods of preparing such "star" block copolymers are disclosed, for example, in U.S. Pat. Nos. 3,985,830 (Fetters et al), 4,086,298 (Fahrbach et al), 4,180,530 (Bi et al) and 4,780,367 (Lau et al).

The block copolymers disclosed in International Patent Publication No. WO90-14662 are of the following general formula:

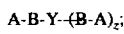

wherein:

Y is a single bond or a multifunctional coupling agent;

A is a hard polymeric segment having a glass-transition temperature of greater than about $-70°$ C.;

B is a soft polymeric segment having a glass-transition temperature of less than about $-30°$ C., and z is about 1 to 15.

Although the block copolymers of the above general formula may have from 1 to 15 arms, the only binders exemplified comprise either:

(i) a mixture of a linear styrene-butadienestyrene block copolymer (z=1), commercially available from Shell under the trade name KRATON 1101 and a styrene-butadiene star block copolymer (z=3,4 and 6), commercially available from the Phillips Chemical Co., under the trade name KR-01, or (ii) the linear block copolymer used alone.

KR-01 consists of styrene-butadiene star block copolymers comprising 65% by weight styrene and 35% by weight butadiene. Each individual star block copolymer comprises at least 3 arms represented by (A-B) linked to and projecting from the central moiety represented by Y. However, in practice, preparations of star block copolymers comprise a heterogeneous population of molecules. That is, the number of arms for the population as a whole is a number average value. KR-01 consists of star block copolymers having predominantly 3 arms with a small quantity of 4 and 6 arm star structures. The number average value for the number of arms has been determined to be close to 3.

DISCLOSURE OF INVENTION

It has now been found that star block copolymers comprising at least 50% by weight of the hard polymer and a greater number of arms per star molecule are particularly suitable for use as binders for magnetic recording media. Magnetic recording media incorporating the aforesaid star block copolymers are found to exhibit improved physical properties when compared with conventional binder systems as well as those described in International Patent Publication No. WO90-14662.

According to the present invention there is provided magnetic recording media of the type comprising magnetizable particles dispersed in a polymeric binder, in which the binder comprises a star block copolymer of general formula (I):

in which:

X represents a polyfunctional coupling moiety and each (A-B) represents a polymeric arm radiating from the polyfunctional coupling moiety X, m has a number average value of at least 6, A represents a hard, glassy polymeric segment and B represents a soft, rubbery polymeric segment, which hard, glassy polymeric segment is incompatible with the soft, rubbery polymeric segment, and in which each arm (A-B) may comprise one or more hard, glassy polymeric segments and one or more soft, rubbery polymeric segments with the proviso that the hard, glassy polymeric segments comprise at least 50% of the total weight of the star block copolymer and the free ends of the arms (A-B) comprise the hard, glassy polymeric segment.

For the purposes of the present invention, m represents the average number of polymeric arms radiating from the polyfunctional coupling moiety X and must have a number average value of at least 6 and preferably at least 7. Generally, m has a number average value no greater than 30, preferably no greater than 20 and more preferably no greater than 12.

The star block copolymers represented by general formula (I) exhibit mechanical properties making them particularly suitable for use as binder materials in magnetic recording media. Magnetic recording media incorporating star block copolymers of general formula (I) are found to have greater durability, increased resistance to environmental degradation and a greater ease of preparation when compared with the media systems of the prior art.

Therefore, according to a further aspect of the present invention there is provided a method of preparing a magnetic recording element comprising dispersing magnetizable particles in a polymeric binder comprising a star block copolymer of general formula (I) and either (a) casting the dispersion to form a self-supporting film or (b) coating the dispersion onto a non-magnetic support to form a supported magnetic recording element.

The use of these star block copolymers in binder preparations for magnetic media is advantageous over commercial systems as the preparation of the magnetic recording media is simplified. As chemical crosslinking is no longer necessary, there is no need to add an activator prior to coating. This avoids many of the problems associated with the unpredictable isocyanate crosslinking reaction described previously.

In addition, a single binder may be used instead of the two component binders used in known magnetic recording materials.

The star block copolymers of general formula (I) can be tailored to provide uniform physical properties over a wide temperature range by careful selection of the hard, glassy polymeric segment (A) and the soft, rubbery polymeric segment (B). By choosing A having a relatively high glass transition temperature and B having a relatively low glass transition temperature, the resulting star block copolymer will show uniform physical properties between the two glass transition temperatures. For example, if A has a glass transition temperature of at least 75° C. and B has a glass transition temperature of no more than 25° C., the resulting star block copolymers would show uniform physical properties in an approximate temperature range from 25° C. to 75° C.

Moreover, the magnetic recording media of the invention may have improved environmental stability. By selecting the polymeric segments represented by A and B so that the copolymer backbone does not contain heteroatoms or hydrolytically unstable linkages, the potential for degradation by hydrolysis is substantially reduced. The star block copolymers of the invention may also be fully or at least partially hydrogenated to reduce their potential for further reaction using such techniques as are known in the art.

Furthermore, star block copolymers of formula (I) may be readily synthesized by anionic methods of polymerization. Advantageously, the anionic method of polymerization allows the polydispersity (of the molecular weight distribution) of the star block copolymers to be reduced to less than 1.5, preferably to 1.2 or less. Consequently, the amount of low molecular weight species present in the binder is substantially reduced, thereby alleviating the problem of head contamination by such species.

DETAILED DESCRIPTION

Each arm (A-B) comprises one or more hard, glassy polymeric segments represented by A and one or more soft, rubbery polymeric segments represented by B, with the free end (i.e., the end not bonded to X) comprising a hard, glassy polymeric segment (A). Preferably each arm (A-B) consists of an outer hard, glassy polymeric segment (A) bonded directly to an inner soft, rubbery polymeric segment (B), which in turn is bonded to the polyfunctional coupling moiety. The weight average molecular weight of (A-B) as a representative measure of arm length is generally greater than $50 \times 10^3$ to allow for steric interaction between adjacent copolymer molecules. Such steric interaction imparts mechanical strength to the media without the need for an additional crosslinking step. The weight average molecular weight of (A-B) is usually no greater than 100,000 so that solutions of the block copolymer do not become too viscous. Too high a viscosity inhibits both copolymer synthesis and its subsequent formulation as a binder. Preferably, the weight average molecular weight of (A-B) is from $50 \times 10^3$ to $80 \times 10^3$ and more preferably $55 \times 10^3$ to $75 \times 10^3$.

The hard, glassy polymeric segment (A) may comprise any suitable polymer, whether a homopolymer or a copolymer, known in the art. Preferably, the hard, glassy polymeric segment (A) comprises a polymer having a glass transition temperature (Tg) of at least 75° C. and more preferably at least 85° C. Generally, the hard, glassy polymeric segment comprises a homopolymer of a monoalkenyl aromatic monomer, preferably a monovinyl aromatic monomer. Examples of suitable monovinyl aromatic monomers include styrene and derivatives thereof, such as 3-methylstyrene, 4-methylstyrene, 4-isopropylstyrene, 2-ethyl-4-benzylstyrene, 4-p-tolylstyrene, 4-(4-phenyl-nbutyl)styrene, 2,4-dimethylstyrene, 2,4,6-trimethylstyrene, 3-methyl-5-n-hexylstyrene, 1-vinylnaphthalene, 2-vinylnaphthalene and alkyl, cycloalkyl, aryl, alkaryl or aralkyl derivatives of vinylnaphthalene. The monovinyl aromatic monomers may be employed individually or as mixtures with one another. Preferably the monovinyl aromatic monomer is styrene used alone.

The hard, glassy polymeric segment (A) comprises at least 50% by weight of the block copolymer and usually no more than 85% by weight of the block copolymer to avoid the media becoming too inflexible. The polyfunctional coupling moiety (X) is present in such small amounts relative to the total weight of the star block copolymer that its presence is relatively inconsequential when compared to the weight of the other polymeric components. Thus, the polyfunctional coupling moiety (X) is deemed by convention to be of negligible weight when calculating the weight percent of the polymeric components represented by A and B. Preferably, the hard, glassy polymeric segment comprises from 55 to 75% and more preferably 65 to 75% by weight of the block copolymer.

The soft, rubbery polymeric segment (B) may comprise any suitable polymer, whether a homopolymer or copolymer, known in the art which is incompatible with the polymer of the hard, glassy polymeric segment (A). Two polymers are said to be incompatible if a blend of the polymers shows a two-phase morphology. This may be detected by a variety of means, including microscopic examination of thin sections, but it is most commonly deduced from the presence of two separate glass transition temperatures for the blend of the polymers. Preferably, the soft, rubbery polymeric segment comprises a polymer having a glass-transition temperature (Tg) no greater than 25° C., more preferably no greater than 0° C., and most preferably no greater than −10° C. Preferably, the soft, rubbery polymeric segment (B) comprises a homopolymer of a conjugated diene, generally comprising from 4 to about 14, preferably 4 to 10, carbon atoms.

Examples of suitable conjugated dienes include 1,3-butadiene, 2-methyl-1,3-butadiene(isoprene), 2,3-dimethyl-1,3-butadiene, 1-phenyl-1,3-butadiene, 1,3-pentadiene (piperylene), 1,3-hexadiene, 4-ethyl-1,3-hexadiene, 1,3-octadiene and 3-butyl-1,3-octadiene. Preferably, the conjugated diene is butadiene or isoprene used alone. Star block copolymers formed from dienes such as butadiene may be fully or partially hydrogenated using techniques known in the art to prevent unwanted or undesirable oxidation or cross-linking of the diene portions.

In a highly preferred embodiment, the star block copolymers of formula (I) comprise styrene-diene copolymers, particularly styrene-butadiene and styrene-isoprene copolymers. These block copolymers have an ordered microstructure having domains of polydiene in a matrix of the polystyrene. The styrene content is greater than 50% by weight of the copolymer to ensure good physical properties. The maximum styrene content is usually no greater than 85% by weight of copolymer to avoid the media becoming too inflexible and rigid. Preferably, the styrene content is from 55 to 75% and more preferably 65 to 75% by weight of the copolymer.

The star block copolymers of formula (I) may be prepared by known techniques of anionic polymerization, described, for example, in U.S. Pat. No. 4,780,367. Most conveniently, one or more monomers corresponding to hard glassy segments (A) are polymerized under conditions affording a living polymer, which is then reacted with one or more monomers corresponding to soft rubbery segments B, again under conditions affording a living polymer. The resulting living linear block copolymer is then reacted with a polyfunctional coupling agent corresponding to X to form the star block copolymer.

The polymerization reaction is normally carried out in solution, typically in an inert organic hydrocarbon solvent. Suitable hydrocarbon solvents are aliphatic, cycloaliphatic and aromatic hydrocarbons which are liquid under the reaction conditions and preferably comprise 4 to 12 carbon atoms. Examples of suitable solvents are isobutane, n-pentane, isooctane, cyclopentane, cyclohexane, cycloheptane, benzene, toluene, xylenes and others. Mixtures of these solvents may also be employed. Furthermore, the polymerization can be carried out in the presence of small amounts, in general from $10^{-3}$ to 5 percent by weight (based on total solvents), of ethers, e.g., tetrahydrofuran, dimethoxyethane, phenyl methyl ether and others, whereby it is possible to influence, in the conventional manner, the rate of polymerization, the configuration of the second polymer, i.e. polymeric segment B and the statistical transition between the segments A and B.

The initiators employed are preferably the conventional monolithium-hydrocarbons of the general formula R—Li, where R is an aliphatic, cycloaliphatic, aromatic or mixed aliphatic-aromatic hydrocarbon radical, which may comprise up to about 12 carbon atoms. Examples of suitable lithium-hydrocarbon initiators are: alkyl-lithium compounds, e.g., methyl-lithium, ethyl-lithium, n-sec- and tert-butyl-lithium and isopropyl-lithium; cycloalkyl-lithium compounds, e.g., cyclohexyl-lithium, and aryl-lithium compounds, e.g., phenyl-lithium, naphthyl-lithium and p-tolyl-lithium. The monolithium-alkyl compounds where the alkyl group comprises from 2 to 6 carbon atoms are preferred, n-butyl-lithium and sec-butyl-lithium being particularly preferred.

The nature of the polyfunctional coupling moiety (X) used is not critical provided it does not significantly detract from the desired properties of the end product.

The polyfunctional coupling moiety is generally at least difunctional and, if it is of the chain terminating type, must be at least hexafunctional, i.e. it should be capable of reacting with six or more of the active living block copolymer chains via the terminal lithiumcarbon species to form a chemical bond and the characteristic star configuration. The coupling of lithium-terminated living polymers with polyfunctional coupling moieties is known in the art and disclosed, for example, in British Patent No. 985 614.

Polyfunctional coupling moieties of the chain terminating type, suitable for the manufacture of star block copolymers of formula (I), are compounds comprising at least 6 groups capable of reacting with the terminal lithium-carbon species to form a chemical bond. Such groups include alkyl halide, silicon halide, epoxide, isocyanate, ketone, ester and acid anhydrides.

Preferred coupling agents are chain extenders, such as polyvinyl-aromatics, especially divinylbenzene and derivatives thereof, as described, e.g., in U.S. Pat. No. 3,280,084. In this case, some divinylbenzene units add on, producing cross-linking and forming a branching center, through which the arms (A-B) may bond to one another, the process being one of chain extension.

In general, the polyfunctional coupling moiety if it is a chain terminator, is added to the reaction solution in amounts equivalent to the total amount of the living polymer blocks, i.e. equivalent to the number of active lithium-carbon bonds in the preformed linear block copolymers. The quantity of coupling moiety used is derived from the actual content (moles/liter basis) of active polymer chain ends in the polymerization mixture. The reaction of the living linear block copolymers with the coupling moiety is preferably carried out under the same reaction conditions as the polymerization of the monomers. The resulting branched block copolymers are isolated from the reaction solution by conventional methods, e.g. by precipitating the polymer from the reaction solution, and filtering it off. Alternatively, if the polymer has been synthesized in an appropriate solvent, the reaction solution may be used directly.

When a chain-extending coupling agent such as divinylbenzene is used, then a mole equivalent ratio of coupling moiety to active chain ends of 3:1 to about 20:1 or higher may be used. The preferred ratios are 4:1 to about 6:1. In the case of difunctional moieties which polymerize during the coupling reaction, such as divinylbenzene, the amount of moiety to be used should be determined for the conditions of reaction, since the number of equivalent functional sites is variable.

The number of arms of the star block copolymer, the molecular weight and the architecture required to produce a polymer of the desired viscosity may be controlled by appropriate selection of the type and quantity of the coupling moiety. For example, in the case of divinylbenzene (DVB) as shown by Fetters et al, U.S. Pat. No. 3,985,830, at least two DVB molecules must add to the end of the copolymer chain in order for linking to occur, such that there is always at least one vinyl group left over for further reaction. In order to link a high percentage of the lithium terminated copolymer arms, a threshold amount of DVB of about two moles of DVB per mole of arms is required. However, since the linking reaction is nonterminating small amounts of DVB in excess of the threshold (e.g. 3 moles DVB/mole arms) can link together large numbers of arms. At mole ratios of DVB greater than the threshold, the stars can have, for example, on average, more than 12 arms per star with the number of arms linked being a factor of steric inhibition and charge density at the forming star nucleus.

The average number of polymeric arms is typically measured by size exclusion chromatography with low-angle laser light-scattering detection (SEC/LALLS). Light scattering (using forward scattering and laser sources) by colloidal-sized particles is related to the molecular weight of the particle. If the weight per unit volume of the particles and the relative refractive index (dn/dc) are known, then the molecular weight can be calculated. Therefore, in SEC/LALLS, the particles are separated in a column and subjected to laser light, the scattering of which yields the molecular weight of the star polymer directly. If the molecular weight of an "arm" is known (the arm is obtained by directly sampling the polymerization mixture before the DVB linking reagent is added), and the molecular weight of the linked-arm star is known, then it is a simple matter to calculate the number of arms per star molecule. The SEC/LALLS system is described by R. C. Jordan et al in "Size Exclusion Chromatography with Low-Angle Laser Light-Scattering Detection", ACS Symposium Series, No 245, 1984.

A typical synthesis procedure is described in U.S. Pat. No. 4,780,367 (Lau et al) and comprises charging a polymerization reactor with dry cyclohexane and dry styrene monomer adding the initiator, e.g. sec-butyl lithium and allowing the styrene block (first polymeric segment) to polymerize for one hour at 60° to 65° C. Dry isoprene is then added to the reaction mixture and the second block allowed to polymerize for a minimum of 2 hours at 50° to 65° C. The block copolymer "arms" are then linked in a star structure by the addition of the coupling moiety, e.g., dry divinylbenzene (commercially available from Aldrich Chemical Co. Ltd., 55%) at 65° C. to 70° C. and maintaining the reaction mixture at this temperature overnight before cooling to room temperature and isolating to remove the polymer by conventional techniques.

The magnetic recording media of the invention may be prepared using conventional techniques known in the art. A good summary of the principles of manufacturing magnetic tapes and discs may be found in "The Complete Handbook of Magnetic Recording—Chapter 13 entitled Manufacture of Magnetic Tapes and Discs" by Finn Jorgensen (3rd Edition—1SBN 0-8306-1979-8). Generally, the magnetizable particles are dispersed in a solution of the star block copolymer using conventional mixing procedures, such as kneading, ball milling (both horizontal and vertical), pebble milling, sand milling, sand shaking etc., followed by filtration to remove lumps, aggregates, agglomerates and foreign matter which cannot be tolerated in the coating mix, deaeration and finally the addition of solvent to provide the desired coating viscosity.

The solvent is generally contained in the magnetic paint in an amount of from 50 to 600 parts by weight based on 100 parts by weight of the magnetizable particles. The precoating mix, or magnetic paint, prepared as described above generally contains the star block copolymer of formula (I) in an amount of from 5 to 100 parts by weight, preferably 7 to 40 parts by weight, based on 100 parts by weight of the magnetizable particles. Other binders may be contained in the magnetic paint (provided they are compatible with the star block copolymer), including linear block copolymers of the general formulae ABA or $(AB)_2X$ where A, B and X are as defined earlier. Such supplementary binders may comprise up to 50 parts by weight based on 100 parts by weight of the magnetizable particles. When linear block copolymers are also used in the media, then the number average value for m may be less than 6.

The magnetic paint may also comprise one or more conventional additives such as lubricants; abrasives, e.g., aluminium oxide; thermal stabilizers, e.g., octadecyl-3,5-di-tert-butyl-4-hydroxyhydrocinnamate; anti-oxidants; dispersants; wetting agents; anti-static agents, e.g., soot, graphite; fungicides, bacteriocides; surfactants; coating aids; non-magnetic pigments etc., known in the art. Such additives may comprise up to 50 parts by weight based on 100 parts by weight of the magnetizable particles.

Examples of lubricants include saturated and unsaturated fatty acids, fatty acid esters, higher fatty acid amides, higher alcohols, silicone oils, mineral oils, molybdenum disulfide, fluorinated polymers, such as perfluoro ethers, and the like.

Examples of antioxidants which may be used in the magnetic media of the present invention include salicylanilide, tin oxide, mercury phenyloctoate, copper naphthenate, zinc naphthenate, trichlorophenol, dinitrophenol, sorbic acid, butyl p-hydroxybenzoate, and the like.

Dispersing agents serve to improve the wetting of the magnetic pigment particles by the binder, and so enhance their uniform dispersion within the binder. The presence of unwetted particles can lead to pigment agglomeration, which causes deterioration of the signal to noise ratio of a recording. Effective dispersants include acrylates, carboxylate polyesters, phosphate esters, phosphate ethers, titanate coupling agents, lecithin, alkyl sulphates, fatty acid amides and the like.

Non-magnetic pigments which may be added as a head cleaning agent or for other purposes include silicon oxide, titanium oxide, aluminum oxide, chromium oxide, calcium carbonate, zinc oxide, talc, kaolin, silicon carbide, carbon black and the like.

Any of the conventional procedures known in the art may be used to cast the coating mix to form a self-supporting film serving as an integral magnetic recording element, or to coat the mix onto a suitable material to form a supported magnetic recording element. For example, direct gravure coating systems, such as offset gravure coaters and reverse roll coaters, and unnipped coating systems such as knife coaters etc., may be used to prepare the media. Spinning and spraying techniques may also be used to prepare magnetic discs.

The thickness of the coated layer is dependent on the nature of the recording element but generally for tapes, cards and discs, the thickness of the layer would typically be from 0.5 to 50 μm, preferably 1.0 to 20 μm and more preferably 1.5 to 10 μm.

Suitable base materials for supported magnetic recording elements are known in the art and typically comprise a non-magnetic support. For tapes and flexible discs, suitable base materials include poly(ethylene terephthalate), commercially available under the trade name Mylar, poly(ethylene-2,6-naphthalate), poly(ethylene), poly(propylene), polycarbonates, polyamides, poly(vinyl chloride), cellulose acetate, cellulose triacetate etc. For hard discs, suitable base materials include aluminium. In some instances, for example, when sheets of poly(ethylene terephthalate) are used, it may be advantageous to apply an intermediate layer, e.g., based on vinylidene chloride copolymers or saturated polyesters, in order to improve the adherence of the magnetic layer for the support. The thickness of the base film is typically about 3 to 100 μm, preferably 5 to 50 μm.

The non-magnetic support may be coated on one or both sides and when coated on one side only, the non-coated (near) side of the support may be coated with a binder material containing carbon black or other static reducing non-magnetic pigments. Once coated, the magnetizable particles may be subjected to one or more after-treatments, such as magnetic orientation, prior to drying the coating. Once dry, the coated layer may be subjected to further treatments, such as calendering to compact the binder and smooth its surface, burnishing and/or buffing and ageing to remove residual solvent not removed in the drying process, before cutting into the desired shape and size.

The solvent content of the coating mix is evaporated during the drying stage, typically by passage through an oven, infrared heater, microwave oven, and the like. The actual choice of coating solvent is largely governed by the particular solubility characteristics of the chosen copolymer, but it should not be reactive with any other component of the medium. Preferred solvents are toluene, cyclohexanone, tetrahydrofuran, methyl ethyl ketone and mixtures thereof.

The magnetic media of the invention are suitable for the preparation of magnetic recording elements such as cards, data cartridges, discs, diskettes, drums and tape for audio, video, instrumentation and computer uses.

The magnetizable particles may comprise any of the magnetizable materials known in the art but are typically finely divided magnetic particles including particles of magnetic oxides such as gamma hematite ($\gamma$-$Fe_2O_3$), magnetite ($Fe_3O_4$), mixed crystals of ($\gamma$-$Fe_2O_3$), and ($Fe_3O_4$), Co-doped $Fe_2O_3$, Co-doped $Fe_3O_4$, Co-doped mixed crystals of $Fe_2O_3$ and $Fe_3O_4$, barium ferrite, Berthollide compounds; various kinds of acicular magnetic alloy powders, such as Fe, Fe—Co, Co—Ni, Fe—Co—Ni, Co—Cr, $CrO_2$, Fe—Co—B, Fe—Co—Cr—B, Fe—Co—V, Mn—Bi, Mn—Al etc.; nitrides of Fe, Fe—Co, Fe—CS—Ni, fine iron etc., and mixtures of two or more of the above.

The invention will now be described with reference to the following examples, in which Copolymers Nos. 1 to 5 comprise styrene:isoprene block copolymers prepared according to the following reaction scheme:

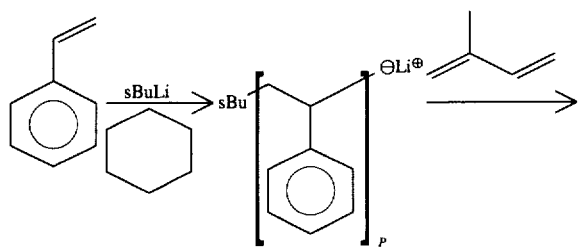

-continued

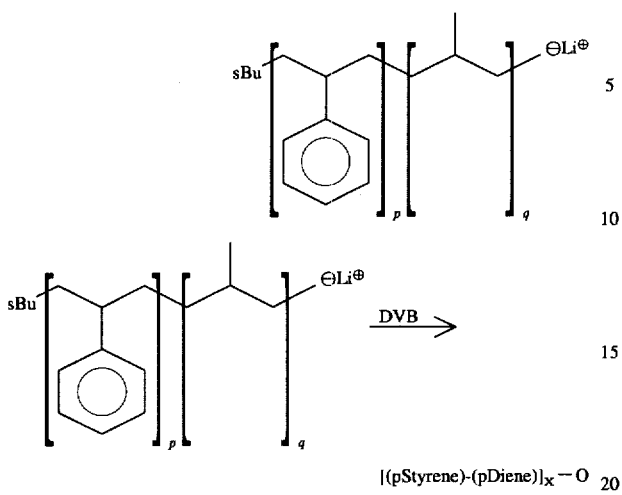

$[(pStyrene)-(pDiene)]_x - 0$ in which;

p and q are integers, x has a number average value of 6 or greater, DVB represents divinylbenzene and sBuLi represents sec-butyl-lithium.

The synthesis protocol is broadly similar to that disclosed in U.S. Pat. No. 4,780,367 (Lau and Silver). It is known from this document that by maintaining a constant ratio of divinylbenzene linking agent to 'living' polymer chain ends, block copolymers may be synthesized having a constant number of (A-B) arms. Copolymers Nos. 1 to 5 were synthesized using a ratio of 4.5 moles divinylbenzene to 1 mole alkyl-lithium initiator to produce star block copolymers having an average of 8 arms per molecule.

Copolymer No. 6 comprises a styrene:butadiene block copolymer prepared by the same synthesis protocol but starting from styrene and butadiene. Copolymer No. 6 again comprises an average 8 arms per molecule.

The percentage styrene content and the weight average molecular weight of (A-B) for each of Copolymers Nos.1 to 6 is presented in Table 1 below.

TABLE 1

| Copolymer | Weight Average Molecular Weight of (A-B)/(10³) | | Styrene Content |
|---|---|---|---|
| No. | Total | Styrene | (%) |
| 1 | 65 | 39 | 59 |
| 2 | 48 | 34 | 71 |
| 3 | 52 | 37 | 71 |
| 4 | 64 | 48 | 75 |
| 5 | 54 | 41 | 76 |
| 6 | 67 | 50 | 75 |

EXAMPLE 1

A coating of each of Copolymers Nos. 1 to 6 was cast from toluene onto successive sheets of release paper. After drying, each coated sheet of paper was cut into 10×½" (25.4×1.3 cm) strips and the copolymer film separated from the paper backing. Individual samples were tested on an INSTRON Model 1026 device and from the resultant stress/strain curves, values calculated for both the tensile strength (maximum stress) at yield and Young's Modulus ($\epsilon$) for each copolymer film. These values are summarized in Table 2 below, together with comparative values obtained for:

Comparative Example A

A representative conventional binder system composed of a mixture of VAGH (a vinyl resin commercially available from Union Carbide) and ESTANE 5703 (a polyurethane commercially available from B. F. Goodrich) crosslinked with DESMODUR L75 (a trifunctional isocyanate available from Bayer).

Comparative Example B

A styrene-butadiene copolymer of the type disclosed in International Patent Publication No. WO90-14662 comprising 70% by weight KR-01 and 30% by weight KRATON 1101 where:

KR-01: is one of a series of K-RESINS commercially available from Phillips Chemical Co., and comprises a styrene-butadiene star block copolymer having a weight average molecular weight for (A-B) of 40×10³; a styrene content of 65% by weight and on average approximately 3 chains per molecule (predominantly 3 chains per molecule but with some 4 and 6 chains).

KRATON 1101: a linear styrene-butadiene-styrene block copolymer, commercially available from Shell and comprising 30% by weight styrene and 70% by weight butadiene.

Comparative Example C

A styrene-butadiene copolymer of the type disclosed in International Patent Publication No. WO90-14662 and comprising 90% by weight of KR-01 and 10% by weight KRATON 1101.

TABLE 2

| Copolymer No. | Young's Modulus/10³ psi (× 6.89 × 10⁶Nm⁻²) | Tensile Strength at Yield/psi (× 6.89 × 10³Nm⁻²) |
|---|---|---|
| 1 | 173 | 2699 |
| 2 | 267 | 2936 |
| 3 | 252 | 3099 |
| 4 | 307 | 3019 |
| 5 | 283 | 3364 |
| 6 | 165 | 3100 |
| A | 163 | 3600 |
| B | 145 | 1912 |
| C | 243 | 2993 |

An analysis of the above data shows that copolymer films prepared from star block copolymers of general formula (I) have tensile properties at least comparable (and often better) to those of the isocyanate crosslinked vinyl urethane binder (Comparative Example A) and improved tensile properties over copolymer films prepared from block copolymers disclosed in International Patent Publication No. WO90-14662 (Comparative Examples B and C).

EXAMPLE 2

A dispersion of a cobalt doped gamma iron oxide magnetic pigment with a surface area of approximately 50 m²/g in Copolymer Nos. 1 and 3, was prepared as follows. A steel vessel (150 ml) was charged with 90 parts by weight of 0.8 to 1.0 μm diameter zirconia milling medium, 30 parts by weight of the pigment, 12 parts by weight of HYPERMER MT-1 (15% w/w solution in toluene) (a polymeric dispersant commercially available from ICI), 30 parts by weight of a 15% w/w solution of either Copolymer No. 1 (Magnetic Recording Element No.1) or Copolymer No. 3 (Magnetic Recording Element No.2), 0.6 parts of a lubricant and 32.8 parts by weight of toluene. The vessel was sealed and agitated in a RED DEVIL Model 5400-Y2 paint shaker until a smooth dispersion was obtained.

A portion of each dispersion was then coated at 2 mil (50 µm) wet thickness onto a 23 µm thick poly(ethylene terephthalate) backing using an auto-knife coater and, once dried, surface treated using a 3-roll calendar manufactured by BF PERKINS of Chicopee, Mass. The bulk magnetics and surface roughness of each coated element were measured using a BH meter and RODENSTOCK RM 400 respectively.

The values obtained for Elements Nos. 1 and 3 were compared with typical values for a commercial recording medium pigmented with a similar oxide, as well as two representative samples of magnetic recording media prepared in accordance with International Patent Publication No. WO90-14662 (Comparative Examples D and E).

Comparative Example D

This media was prepared in a similar manner to Elements Nos. 1 and 2 above but incorporating a 3:1 mixture of KR-01 and KRATON 1101 as a binder therefor.

Comparative Example E

As per Comparative Example D but substituting a 1:1 mixture of 2 conventional phosphate ester surfactants for HYPERMER MT-1.

The results are summarized in Table 3 below:

TABLE 3

| Element | Coercivity (Oe) | Squareness ($\phi r/\phi m$) | Switching Field | Surface Roughness Distribution |
|---|---|---|---|---|
| 1 | 942 | 0.833 | 0.455 | 6.3 ± 1.3 |
| 2 | 939 | 0.826 | 0.455 | 5.9 ± 2.5 |
| D | 932 | 0.910 | 0.476 | — |
| E | 795 | 0.620 | 0.833 | — |
| Commercial Medium | 938 to 952 | 0.810 to 0.850 | 0.400 to 455 | <7 |

Coercivity: is the magnetic field strength at which flux reversal of a magnetic particle can occur. The coercivity of a pigment is tailored to a given application as it should not be so high that switching (i.e. writing) cannot occur but should be high enough to resist self demagnetization. It should therefore be within specification for a given application.

Squareness: the squareness of a medium is a measure of the degree of orientation of the magnetic particles, and is the ratio between the remanent saturation magnetization and the saturation magnetization. A high degree of orientation provides for increased output at longer recording wavelengths.

Switching Field Distribution: a narrow range of individual particle coercivities within a medium is desirable, providing shorter transition zones at flux reversals in digital recording, and a shorter recording zone in analog recording. This coercivity range is commonly referred to as the switching field distribution.

EXAMPLE 3

A magnetic dispersion containing the following component parts was made up using a horizontal media mill:

| (i) | cobalt doped magnetite ($Fe_3O_4$) with a coercivity of approximately 700 Oe | 29.5 parts by weight |
| (ii) | green chrome | 1.2 parts by weight |
| (iii) | HYPERMER MT-1 | 1.8 parts by weight |
| (iv) | Copolymer No 7* | 5.6 parts by weight |
| (v) | butyl myristate | 0.5 parts by weight |
| (vi) | toluene | 61.4 parts by weight |

*Copolymer No. 7 is a styrene-isoprene copolymer having a weight average molecular weight for (A-B) of $60 \times 10^3$, a styrene content of 73% by weight and an average of 7 arms per molecule.

The resulting dispersion was coated, using a reverse rotogravure method, onto 11 µm thick smooth poly(ethylene terephthalate) backing to give a coating 4.7 µm thick (after calendering). A sample of the medium so produced was found to have a coercivity of 719 Oe and a squareness of 0.68. Typical values for a commercial recording medium prepared using similar coating conditions are a coercivity of approximately 700 Oe and a squareness of 0.65.

"HYPERMER MT-1", "ESTANE", "DESMODUR", "INSTRON", "RODENSTOCK", "RED DEVIL", "VAGH", "K-RESIN", "KR-01" and "KRATON 1101" are all trade names.

We claim:

1. A magnetic recording medium comprising a magnetic paint coated on a nonmagnetic support, wherein the magnetic paint comprises magnetizable particles dispersed in a polymeric binder, wherein the binder consists essentially of a star block copolymer of general formula (I):

$$(A-B)_m-X$$

in which;

X represents a polyfunctional coupling moiety and each (A-B) represents a polymeric arm radiating from the polyfunctional coupling moiety X, m has a number average value of at least 6, A represents a polymeric segment having a glass transition temperature of at least 75° C. and B represents a polymeric segment having a glass transition temperature no greater than 25° C., wherein polymeric segment A is incompatible with the polymeric segment B, and wherein each arm (A-B) may comprise one or more polymeric segments A and one or more polymeric segments B with the proviso that the polymeric segments A comprise at least 50% of the total weight of the star block copolymer and the free ends of the arms (A-B) comprise the polymeric segment A.

2. Magnetic recording media as claimed in claim 1, wherein the polymeric segment A comprises a homopolymer of a monovinyl aromatic monomer.

3. Magnetic recording media as claimed in claim 2, wherein the monovinyl aromatic monomer is styrene.

4. Magnetic recording media as claimed in claim 1, wherein the polymeric segment B comprises a homopolymer of a conjugated diene.

5. Magnetic recording media as claimed in claim 4 in which the conjugated diene is butadiene or isoprene.

6. Magnetic recording media as claimed in claim 1 in which the polydispersity of the block copolymer is no greater than 1.2.

7. A method of preparing a magnetic recording element comprising the steps of:

(a) dispersing magnetizable particles in a polymeric binder comprising a star block copolymer of general formula (I):

$(A-B)_m-X$ in which;

X represents a polyfunctional coupling moiety and each (A-B) represents a polymeric arm radiating from the polyfunctional coupling moiety X, m has a number average value of at least 6, A represents a polymeric segment having a glass transition temperature of at least 75° C. and B represents a polymeric segment having a glass transition temperature no greater than 25° C., wherein polymeric segment A is incompatible with the polymeric segment B, and wherein each arm (A-B) may comprise one or more polymeric segments A and one or more polymeric segments B with the proviso that the polymeric segments A comprise at least 50% of the total weight of the star block copolymer and the free ends of the arms (A-B) comprise the polymeric segment A; and:

(b) coating the dispersion onto a non-magnetic support to form a supported magnetic recording element.

\* \* \* \* \*

UNITED STATES PATENT AND TRADEMARK OFFICE
CERTIFICATE OF CORRECTION

PATENT NO. : 5,487,951
DATED : January 30, 1996
INVENTOR(S) : Evans et al

It is certified that error appears in the above-indentified patent and that said Letters Patent is hereby corrected as shown below:

Column 13, Table 3, line 39, Element D, under "Squareness", "0.910" should be --0.810 --.

Signed and Sealed this

Twenty-eighth Day of May, 1996

Attest:

BRUCE LEHMAN

*Attesting Officer*      *Commissioner of Patents and Trademarks*